July 28, 1959  F. C. FERNANDEZ  2,896,215
PROTECTIVE HOOD

Filed Feb. 2, 1956

INVENTOR.
FRANK C. FERNANDEZ
BY Elliott & Pastoriza
ATTORNEYS

July 28, 1959  F. C. FERNANDEZ  2,896,215
PROTECTIVE HOOD

Filed Feb. 2, 1956  3 Sheets-Sheet 2

INVENTOR.
FRANK C. FERNANDEZ
BY Elliott & Pastoriza
ATTORNEYS

July 28, 1959 F. C. FERNANDEZ 2,896,215
PROTECTIVE HOOD

Filed Feb. 2, 1956 3 Sheets-Sheet 3

INVENTOR.
FRANK C. FERNANDEZ
BY Elliott & Pastoriza
ATTORNEYS

United States Patent Office 2,896,215
Patented July 28, 1959

2,896,215

PROTECTIVE HOOD

Frank C. Fernandez, Santa Monica, Calif.

Application February 2, 1956, Serial No. 562,968

9 Claims. (Cl. 2—8)

This invention relates generally to protecting devices and more particularly to a welding hood incorporating improved mechanism for moving the conventional light filtering eye shield from the hood.

Present day welding helmets include light filtering eye shields usually in the form of several layers of colored glass to protect the welder's eyes from the work. Ordinarily, the hood is pivoted to a head band support so that it may readily be swung back to remove the eye shield from the wearer's line of vision and enable him to inspect the weld during intervals of the welding operation. This action requires the use of one of the welder's hands resulting in inconvenience, waste motion, and lost time, since one or more of the welding tools must be set aside in order to free the hand.

One solution proposed for this problem is to provide a mechanical mechanism within the welding hood adapted to be actuated by a chin rest for moving aside the light filtering eye shield when clear vision is desired. An important consideration in such a mechanism is the avoidance of cluttering the inside of the welding hood with the actuating apparatus as otherwise the hood may be obstructed when swung up from its normal position. It is also important that complete moving out of the line of vision of the eye shielding means be achieved by relatively little movement of the chin inasmuch as more positive muscle control and movement of the chin is realizable over a small distance as compared with a relatively large distance.

It is a primary object of the present invention accordingly, to provide an improved actuating mechanism responsive to movement of a welder's chin for moving the conventional eye shield out of the welder's line of vision, whereby the welder's hands will be free during all steps of a welding operation.

Other important objects of the invention are to provide a mechanism of the above type which is simple, reliable in operation, capable of effecting a relatively large movement of the eye shield in response to a relatively small movement of the wearer's chin, and which does not present undue obstructions within the interior of the hood.

These and other objects and advantages of this invention are attained by providing a drum means secured to an edge portion of the light filtering eye shield to be moved. Flexible line means in the form of a cable are adapted to be wrapped about the drum means to frictionally engage it and then pass down the side portion of the hood in an unobtrusive manner to connect to a chin rest means. The chin rest means itself includes a chin pad which may be adjusted in position relative to the wearer's head for optimum ease of operation. The arrangement is such that a small movement of the chin will pull the cable to rotate the drum means at least a quarter turn whereby the eye shield is rotated ninety degrees out of the line of vision. Since the drum is of a relatively small diameter and need only turn ninety degrees, the cable movement is nominal. Further, because of the relatively small movement of the chin pad required to move the eye shield, this eye shield movement may be effected extremely rapidly and with positive control.

In one preferred embodiment of the invention, the eye shield means comprises a pair of eye shields disposed adjacent each other in a substantially common plane and the drum means includes a pair of drum elements secured adjacent corners of the eye shields respectively. These drum elements axially extend normally from the common plane of the shields so that rotation of each of the drums arcuately swings the eye shields in their own planes.

In a second embodiment, the eye shield means comprises an integral eye shield disposed in a given plane, and a pair of drum elements secured adjacent opposite edges of the shield with a common axis of rotation lying in the plane of the shield. With this arrangement, rotation of each drum arcuately swings the shield out of its normal plane. In this latter design, the window frame of the hood is normally open so that the eye shield can swing outwardly and upwardly through this window frame.

A better understanding of the invention and its various embodiments will be had by referring to the accompanying drawings in which.

Figure 1:
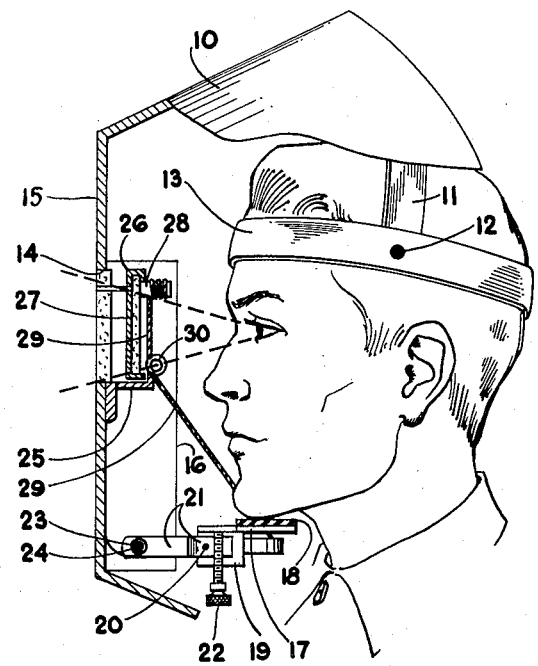
Figure 1 is a side view partly in cross section of a preferred embodiment of the actuating mechanism of this invention.

Referring to Figure 1, there is shown a welding hood 10 including a hood supporting band 11 pivoted at 12 to a conventional head band 13. When the hood 10 is not in use, it is simply swung upwardly in a clockwise direction about the pivot point 12 and the head band 13 removed.

The face of the hood 10 includes a window opening 14 cut in a front frame plate 15 provided with side flange 16 extending rearwardly within the hood 10. Also included within the hood is a chin rest means comprising a chin rest 17 and rubber pad 18 adapted to engage the lower portion of the wearer's chin as shown. The chin rest 17 includes a U-shaped bracket 19 pivoted at 20 to a brace member 21. By this arrangement the chin rest may be pivotally raised or lowered with respect to the upper seating edge of the brace 21 by means of a set screw 22 threaded in the end portion of the brace. The other end of the brace 21 is pivoted to the flange 16 as by pivot pin 23. Pin 23 includes a spiral type spring 24 having an end resting against the rear of the front frame plate 15 to bias the brace member to pivot in a clockwise or downward direction with respect to the frame flange.

As shown in Figure 1, the front plate 15 includes an L-shaped channel member 25 extending horizontally below the window frame opening 14. The channel 25 serves as a support for a light filtering eye shield comprising a C-shaped bracket or casing 26 supporting a colored glass plate 27. The glass plate 27 has rigidly secured therein a drum element 28 extending through the plate to the front frame of the hood 10 wherein it is supported and journaled. A cable 29 is wrapped about the drum 28 for several turns to frictionally engage it and then passes down under a roller 30 mounted for rotation in the flange 16, and thence downwardly to connect to the brace member 21 to one side of the chin rest 17.

Figure 2:
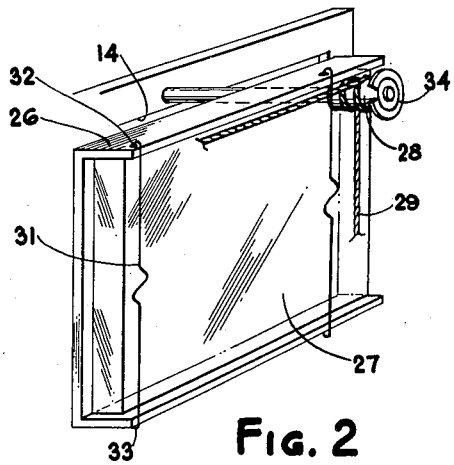
Figure 2 is an enlarged perspective view of one of the eye shield members shown in Figure 1.

Referring to the enlarged perspective view of Figure 2, it will be noted that the colored glass plate 27 is secured within the C-shaped casing 26 by means of an S-spring 31 hooked to the opposite edge portions of the casing as at 32 and 33. By pinching the S-shaped spring 31 at its curved central portions, the spring may be expanded and thus released from the hook openings at 32 and 33 in the casing whereby the colored glass plate 27 may be easily removed. It will also be noted in the construction of Figure 2, that the drum portion about which the cable 29 is wrapped is provided at its extreme end with an arcuate lock washer 34 to provide an annular flange thereby insuring that the cable 29 will not wind off the end of the drum.

Figure 3:
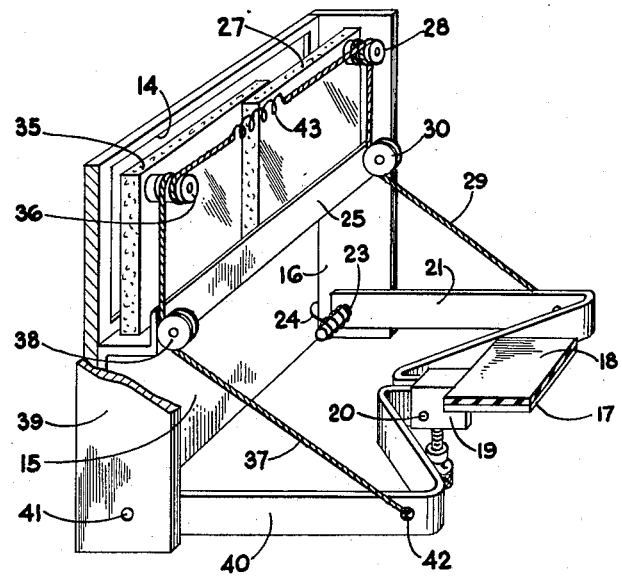
Figure 3 is a schematic perspective view of the frame structure and actuating mechanism of Figure 1 in its normal position during a welding operation.

Referring now to Figure 3, the entire structure is shown in cutaway perspective view wherein it will be noted that the eye shielding means includes a second colored glass plate 35 having its rear surface lying in substantially the same plane as the front surface of plate 27. As shown, the plate 35 similarly includes a drum 36 and a cable portion 37 wrapped about the drum and passing under a roller 38 mounted for rotation to a side flange 39, part of which has been broken away in order not to obscure portions of the drawing. A brace member 40 similar to brace member 21 is pivoted at 41 to the lower portion of the side flange 39. As shown in the drawing, the brace members 21 and 40 extend rearwardly in substantially parallel relationship for a given distance and then turn inwardly to pass under the U-shaped bracket 19 of the chin rest structure. The cable 37 connects to the brace member 40 as at 42 in a manner analogous to the connection of the cable 29 to the brace member 21. By this arrangement, the cables 29 and 37 pass down the respective inner sides of the hood and there is no obstructing mechanism between the cables or in the line of vision.

The upper portions of the cables 37 and 29 respectively pass from the drums 28 and 36 towards each other to connect to the opposite ends of tension spring 43. Spring 43 tends to bias the drums 28 and 36 in a rotational direction such as to hold the colored glass plates 27 and 35 in their normal positions against the bottom of the L-shaped channel 25. The spiral spring 24 on the pivot pin 23 of the brace member 21 previously mentioned, will serve to maintain the cables 29 and 37 taut.

Figure 4:
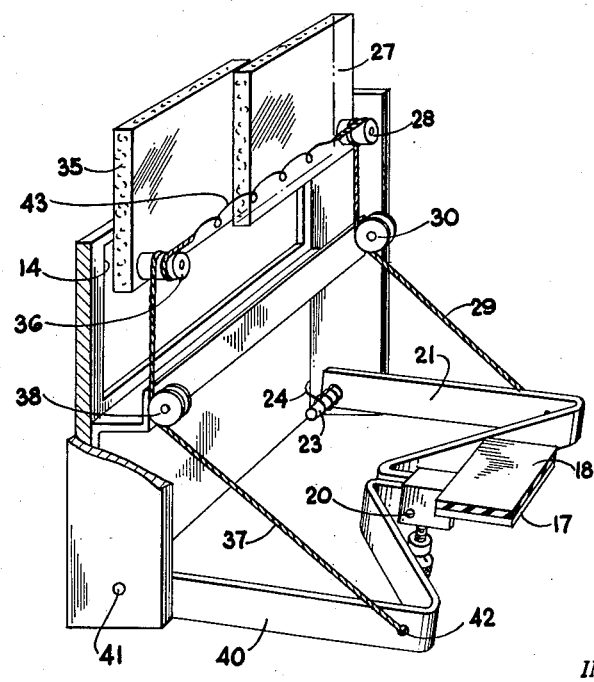
Figure 4 is a view similar to Figure 3 showing the mechanism in its operated position with the eye shields moved out of the line of vision.

The operation of the actuating mechanism will be clear from Figure 4. When the wearer of the welding hood lowers his chin to depress the pad 18, the brace members 21 and 40 are simultaneously swung downwardly about the pivot points 23 and 41 respectively. This downward motion pulls the cables 29 and 37 which in turn rotate the drums 28 and 36 in a clockwise and counter clockwise direction respectively as viewed from the wearer's position. By having the cables pass several turns about each of the drums, there is sufficient frictional engagement to cause the desired rotation of the drums. This rotation need only be over an arc of 90° to swing the plates respectively upwardly to the positions shown in Figure 4. It will be evident, therefore, that very little movement of the chin rest is necessary. When the wearer releases his chin pressure on the chin rest, the glass plates 27 and 35 will swing down to their normal position. Ordinarily, the plates would fall by gravity alone, but to insure a positive action in the event the welding hood is not always in a vertical position, the tension spring 43 insures positive closing by pulling on the drums to rotate them back to the position shown in Figure 3.

Figure 5:
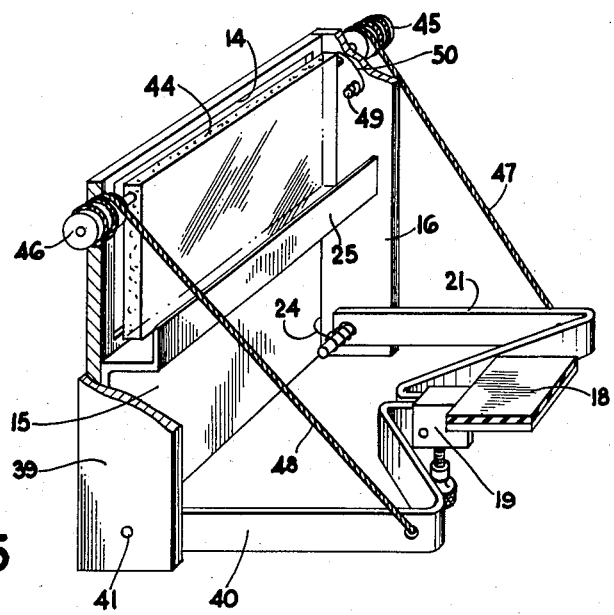
Figure 5 is another perspective view of a frame structure embodying a modified form of the invention, showing the eye shield in its normal position; and, Figure 6 is a view similar to Figure 5 showing the mechanism in its operated position with the eye shield moved out of the line of vision.

Referring now to Figure 5 there is shown a modified embodiment of the actuating mechanism. In Figure 5 identical components to those used in Figures 3 and 4 are indicated by the same reference numerals. In the embodiment of Figure 5, however, the two eye shields are replaced by a single integral colored glass plate 44 having drum elements 45 and 46 secured to opposite edge portions in axial alignment as shown. Cables 47 and 48 respectively wrap about the drums 45 and 46 and are secured at their far ends to opposite sides of brace members 21 and 40. The drums 45 and 46 are mounted for rotation in the side flanges 16 and 39, the side flange 39 being broken away in order not to obscure portions of the drawing. A small spiral spring 50 is secured to the shaft portion of the drum 45 and biased downwardly against a projection 49 from the flange 16 whereby the drum 45 is biased in a rotational direction to urge the lower edge of the glass plate 44 against the upright portion of the L-channel 25, thereby biasing the glass plate to its normal position.

Figure 6:
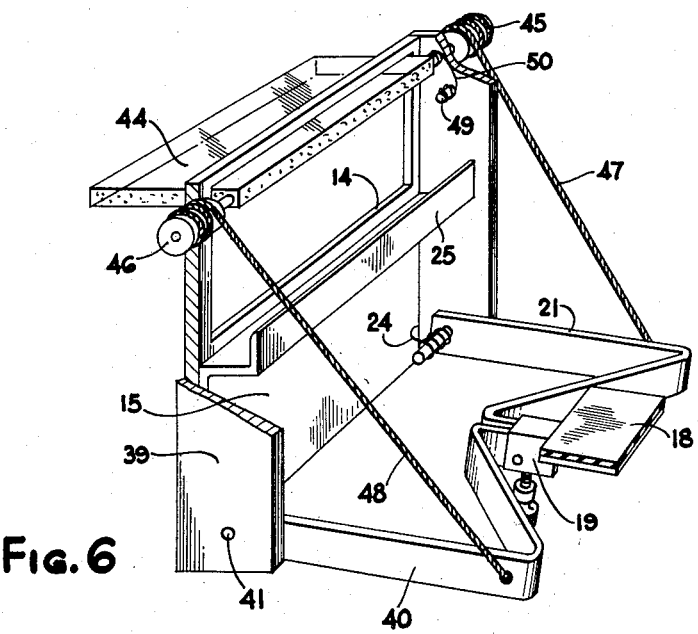

The operation of the embodiment shown in Figure 5 will be clear by reference to Figure 6 which shows the integral glass plate 44 swung out of the line of vision as a result of depression of the chin rest 18. As in the case of the embodiments of Figures 3 and 4, only a quarter rotation of the drums 45 and 46 is necessary to effect the desired movement so that very little movement of the chin rest 18 is necessary. Further, as in the case of the previous embodiment, the actuating cables 47 and 48 pass down the inner sides of the hood out of the line of vision whereby there are no serious obstructions within the hood.

From the description of the above two embodiments, it will be evident that the present invention provides a greatly improved means for moving the eye shield in conventional welding helmets out of the line of vision of the wearer. The operator may thus continue to use both hands during a welding operation and periodically inspect the work without having to swing the entire welding hood away from the front of his face.

Minor modifications of the actuating mechanism falling within the scope and spirit of the present invention will occur to those skilled in the art. The described embodiments are therefore not to be thought of as limited to the precise structures shown for illustrative purposes.

What is claimed is:

1. In a protective hood including a front frame for supporting eye shield means normally in the line of vision of a wearer, the combination comprising: a pair of brace members pivotally secured to opposite sides of said front frame below said eye shield means and extending rearwardly in substantially parallel relationship for a given distance, said brace members being spaced apart to pass adjacent the opposite interior sides of said protective hood, said brace members then turning in towards each other to form a seat; a chin rest mounted on said seat such that pivotal movement of said brace members can be effected upon movement of said chin rest by a wearer's chin; drum means rotatably supported on opposite sides of said front frame above the pivotal mountings of said brace members, respectively, said drum means being rigidly secured to said eye shield means such that rotation of said drum means rotates said eye shield means out of said line of vision; flexible line means having one end portion wrapped about said drum means and its other end portion connected to said brace members at points spaced rearwardly from the pivotal mounting of said brace members; and means adapted to insure the frictional engagement between said flexible line means and said drum means at all times whereby pivotal movement of said brace members pulls on said flexible line means to rotate said drum means.

2. A hood according to claim 1, including an adjustable securing means between said chin rest and said seat for holding said chin rest in a desired position with respect to said seat.

3. A hood according to claim 1, including spring means operatively coupled between said brace members and said frame for normally biasing said brace members in a direction to maintain said flexible line means taut.

4. A hood according to claim 3, including spring biasing means associated with said drum means for biasing said eye shield means in the normal line of vision position.

5. A hood according to claim 1, in which said frame comprises a front plate having a window opening registering with said eye shield means, and side flanges extending rearwardly from said front plate, said brace members being respectively pivotally secured to said side flanges.

6. A hood according to claim 1, in which said eye shield means includes a pair of eye shields disposed adjacent to each other in a substantially common plane, and said drum means comprises a pair of drum elements secured adjacent a corner of each eye shield respectively and axially extending normally from said plane whereby rotation of each drum arcuately swings said eye shields in said plane.

7. A hood according to claim 6, including a pair of rollers journaled in opposite sides of said frame below said drums respectively, said flexible line means comprising a cable passing from one of said brace members under one of said rollers to wrap around one of said drum elements for a plurality of turns to frictionally engage the same, thence, having a portion passing across to the other of said drum elements and wrapped therearound for a plurality of turns to frictionally engage the same, thence, passing under the other of said rollers back to the other of said brace members, said portion passing across to the other of said drum elements having a tension spring interposed therein to bias said drums in a rotational direction to keep said eye shields in normal line of vision position.

8. A hood according to claim 1, in which said eye shield means includes an integral eye shield in a given plane, and said drum means comprises a pair of drum elements secured adjacent opposite edges of said eye shield respectively and having a common axis of rotation lying in said plane, whereby rotation of each drum element arcuately swings said eye shield out of said plane.

9. A hood according to claim 8, in which said flexible line means comprises a pair of cables connected to said drum elements respectively and wrapped about each a plurality of turns to frictionally engage the same, said cables passing from said drums to connect to said brace members respectively; and spring means connected between at least one of said drum elements and said frame to bias said one of said drum elements in a rotational direction to keep said eye shield in normal line of vision position.

References Cited in the file of this patent

UNITED STATES PATENTS

| | | |
|---|---|---|
| 569,925 | Krames | Oct. 20, 1896 |
| 1,800,656 | Norton | Apr. 14, 1931 |
| 1,842,675 | Kannenberg | Jan. 26, 1932 |
| 2,212,014 | Doyle | Aug. 20, 1940 |
| 2,384,798 | Conway | Sept. 18, 1945 |